United States Patent [19]
Auerbach et al.

[11] Patent Number: 5,355,371
[45] Date of Patent: Oct. 11, 1994

[54] MULTICAST COMMUNICATION TREE CREATION AND CONTROL METHOD AND APPARATUS

[75] Inventors: Joshua S. Auerbach, Ridgefield, Conn.; Chee-Seng Chow, Ossining, N.Y.; John E. Drake, Jr., Pittsboro, N.C.; Prabandham M. Gopal, Wayne, N.J.; Elizabeth A. Hervatic, Apex, N.C.; Marc A. Kaplan, Katonah, N.Y.; Marcia L. Peters, Pittsboro, N.C.; Michael J. Ward, New Haven, Conn.

[73] Assignee: International Business Machines Corp., Armonk, N.Y.

[21] Appl. No.: 900,628

[22] Filed: Jun. 18, 1982

[51] Int. Cl.$^5$ ............... H04L 12/46; H04L 12/44; H04L 12/56
[52] U.S. Cl. ............... 370/60; 370/85.13; 370/94.3
[58] Field of Search ............ 370/94.1, 60, 60.1, 370/85.13, 85.14, 54, 94.3; 340/825.02, 825.03

[56] References Cited

U.S. PATENT DOCUMENTS

| | | |
|---|---|---|
| 4,466,060 | 8/1984 | Riddle . |
| 4,706,080 | 11/1987 | Sincoskie . |
| 4,796,023 | 1/1989 | King . |
| 4,809,362 | 2/1989 | Claus et al. . |
| 4,864,559 | 9/1989 | Perlman ............... 370/94.3 |
| 4,967,345 | 10/1990 | Clarke et al. . |
| 4,972,409 | 11/1990 | Backes ............... 370/85.14 |
| 5,088,032 | 2/1992 | Bosack ............... 370/94.1 |
| 5,166,931 | 11/1992 | Riddle ............... 370/94.1 |

Primary Examiner—Douglas W. Olms
Assistant Examiner—Chau T. Nguyen
Attorney, Agent, or Firm—Edward H. Duffield; Gerald R. Woods

[57] ABSTRACT

In a multicast network communication system, administration of the communication path making up the multicast tree itself has been separated from control and administration of the network. Creation of a multicast distribution tree and control over the membership thereof, is separately controlled independently from the creation and use of the tree transmission path used to communicate among the members of a multicast set. Transmission distribution trees are set up when a transmission request is received and the properties of the transmission path that is required are known. Transmission paths are created and controlled by all nodes in the communications system, each node having necessary control code and processors for responding to requests from set members to transmit a message to groups of users by creating and activating the necessary tree communication path distribution linkages. A distribution tree is created by the Tree Leader by generating a tree address using a random number generator. A tree address correlator is generated utilizing network and node identifiers unique for the network, and a list of subnodes or users connected for each member of the multicast tree set is generated. Using this information, a tree distribution path is computed to cover all of the subnodes required and a tree set up request message is sent by the Tree Leader along a computed path to each involved subnode. Each subnode returns a message indicating whether the tree address is already in use or is available for use. Successfully negotiated tree addresses are marked at the path link initiation and termination points at each node through the network.

19 Claims, 11 Drawing Sheets

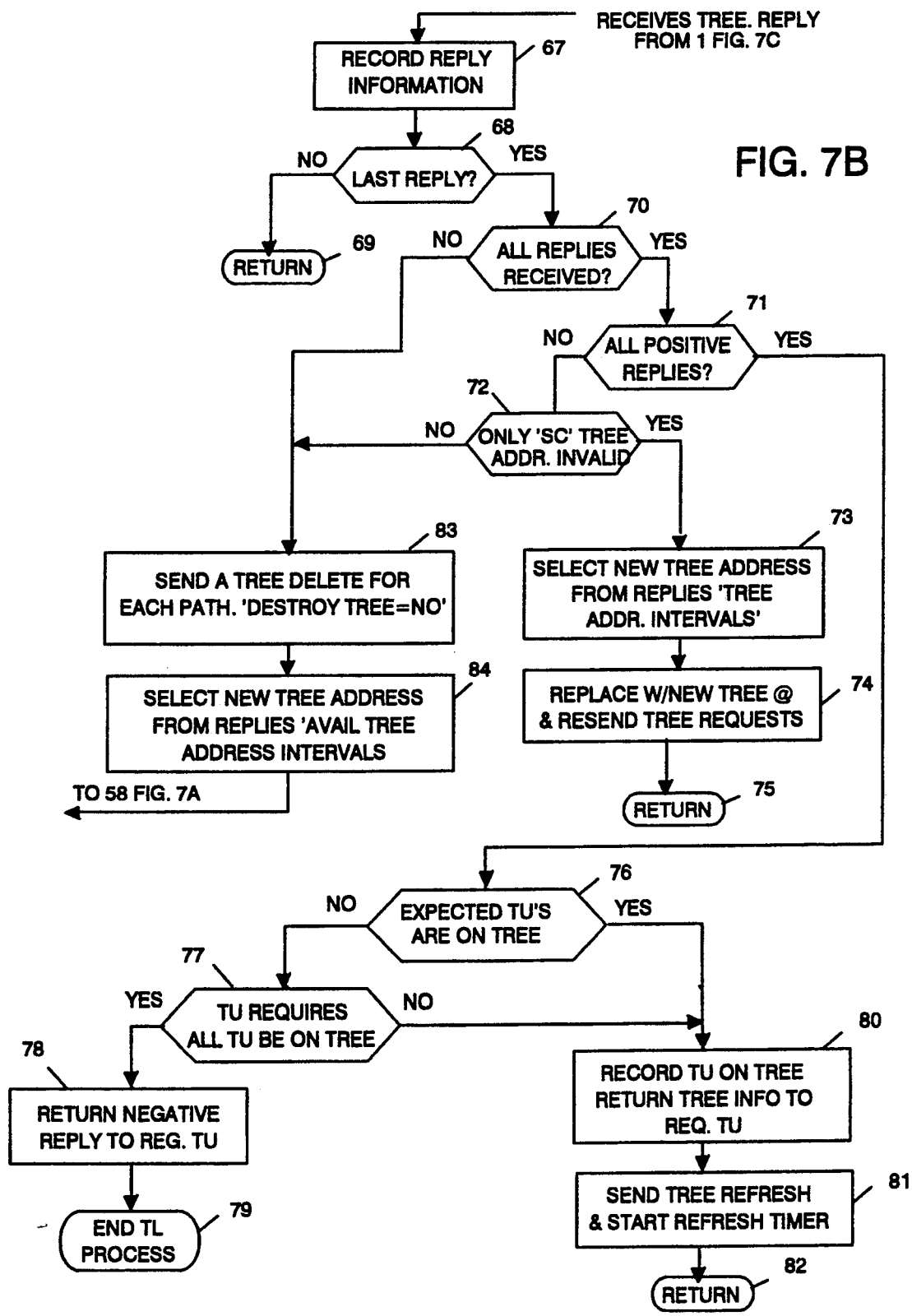

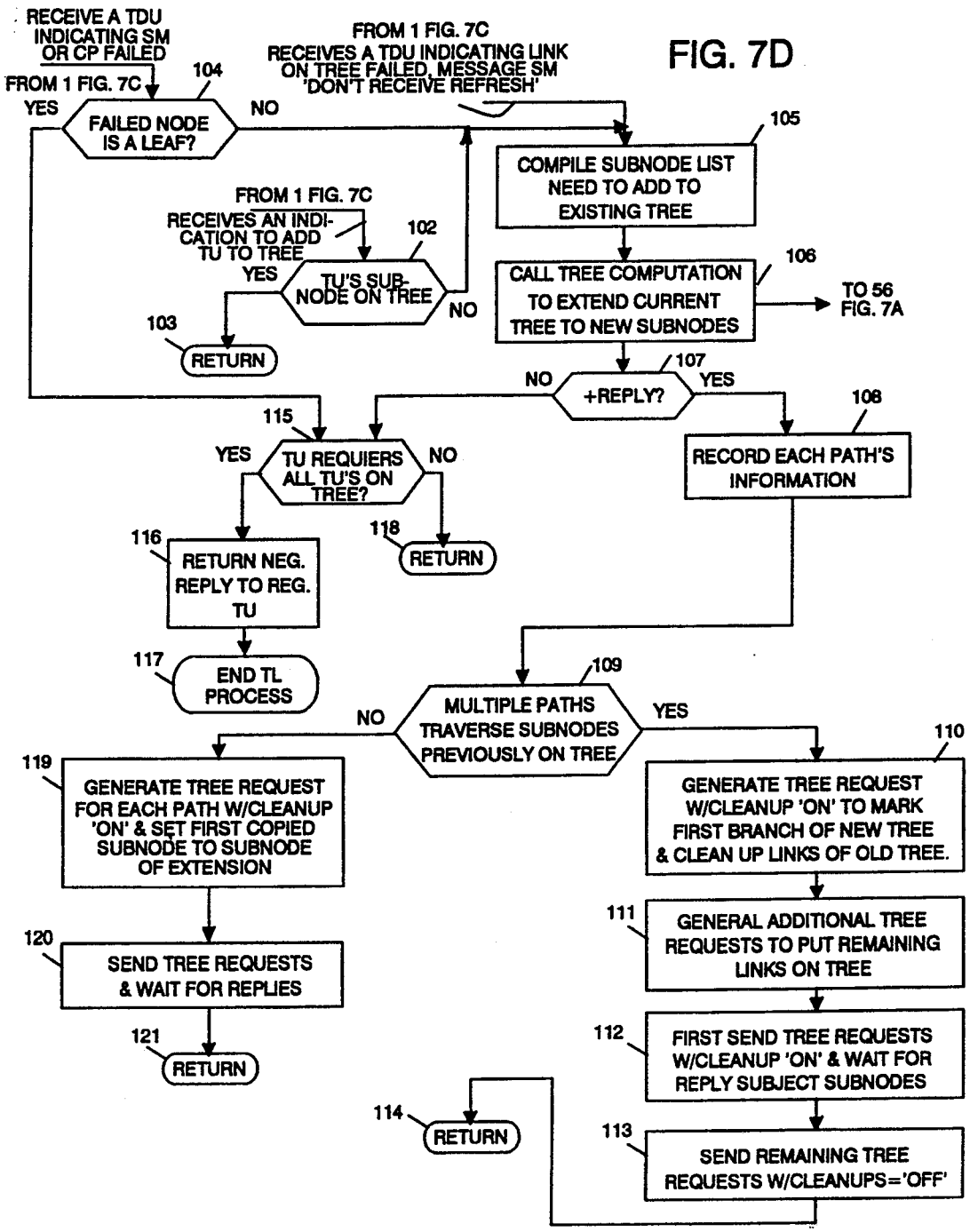

MULTICAST COMMUNICATION TREE CREATION AND CONTROL METHOD AND APPARATUS

RELATED APPLICATIONS

This application is closely related to our own, commonly assigned copending application Ser. No. 07/900,647 filed Jun. 18, 1992, and relating to the improved communication network utilized in the present invention for administering the set of users or group of users wishing to communicate using a multicast system in which each node contains a processor, a database holding the configuration information for the currently existing network elements, and a set manager having operative code executable by the processor for performing network Registrar, Set Leader, Surrogate Set Leader and Set Manager functions for managing the communications network. The present invention addresses itself to the provision at each Set Manager node of a Tree Leader function and its supporting apparatus and method.

FIELD OF THE INVENTION

This invention relates to packet transmission communications systems in general, and more particularly, to the management of multicast tree communication methods and devices in such systems.

PRIOR ART

The use of packet transmission techniques in multinode communications networks has become quite commonplace. Such systems normally include a number of packet switching nodes interconnected with transmission links forming the overall communication system. Digital information is divided into groups of packets, each having a header with the necessary routing information necessary for controlling the switching nodes to move the packet from the originating node to its destination or destinations. Such systems are used not only for small, local servicing of clustered data processing sites, but also for large, widely distributed data processing functions of national or international scope.

Routing protocols or methods are used to control the routing of the packets from node to node through the transmission system. Automatic Network Routing (ANR) uses a concatenation of linked labels or identifiers for the successive legs of the packet switching route. Labels are stripped away as the packet traverses the network, always leaving the next required label at the head of the routing field. The compiling and management of the these concatenated labels represents possibility for error and requires extra processing. This may be avoided by setting up a distribution tree defined as a connected set of network nodes and links. In such a tree, a unique tree address is used in the routing field of the packet header and the same tree address is associated with every link forming the tree. When a multicast packet reaches a packet switching node, the tree address in the packet is compared to the tree address associated with all outgoing links from the node. The packet then may be propagated from the node on one or a plurality of links for which an address match occurs. Great efficiency is achieved by having multiple branches connected to a switching node over which the packets may be propagated simultaneously to a relatively large number of eventual users in a multicast system.

Multicast tree routing involves the creation and maintenance of a set of transmission systems for users who wish to communicate over the network via a packet switching protocol. This also requires the determination and maintenance of an optimum path for interconnecting the members of the set to one another. In the prior art, it has been common to create and use a multicast tree for well known groups of users, but considerable problems arise when the membership of the group changes, hardware failures occur, or reactivation of a user or a partition of the tree create loops in the tree route. The set up or definition of the tree routes is thus an item of significant interest about which much has been written.

For example, see Bubenik et al, "Multipoint Connection Management in High Speed Networks", in the proceedings of the IEEE INFOCOM 1991 appearing in the IEEE April 1991. Also see Segall et al, "Reliable Multiuser Tree Setup with Local Identifiers", appearing as a research report of the IBM Corporation, dated December 1990.

Methods of setting up tree distribution mechanisms have followed various procedures described in the prior art just noted. These include both a serialized algorithm in which the route is calculated to produce a concatenation of link identifiers, or calculation is conducted in a hop-by-hop process to minimize the path length. Neither of these approaches is considered to be efficient, in that the tree set up messages must be propagated from node to node in a serial fashion and the results interpreted to provide a desired solution.

Objects of the Invention

In view of the foregoing known difficulties in prior art multicast packet communications systems, it is an object of the present invention to provide an improved method and system for setting up multicast tree communication routes independent of the control and administration of the multicast user set itself.

Yet another object of the invention is to provide an improved system of packet communication, in which the administration of transmission paths in a multicast tree routing scheme is carried on by each tree organization in the form of a designated tree leader in each tree in the system.

These and other objects of the invention which are not specifically enumerated are met in the preferred embodiment which may be briefly described in the following.

BRIEF SUMMARY OF INVENTION

This invention utilizes facilities in each individual node including a processor, a communications network topology database, necessary memory, and executable programs for carrying out various control and management functions. As described in the aforementioned copending and commonly assigned application, each node is constituted with operative code to act as a Set Manager that may assume various roles, depending on the needs of a user set that may be served by the Set Manager. The primary functions of the Set Manager are involved with the set creation, modification and dissolution, and have been described in the aforementioned application. Other functions are uniquely and separately associated with the creation and management of the distribution trees within the network controlled by the Set Manager operating in its various roles. The creation, dissolution, and control of the distribution tree within the network is a separate function assigned to a Tree Leader (TL). The Tree Leader residing in any node may be invoked in response to requests from set members or outsiders to transmit a message to a known group, or to create or activate a tree communication path or paths for the carrying of multicast packets. The advantage of separating the set administration for the set of users from the tree communication creation and administration is the more efficient response to changes in set membership, and a more rapid response to communication failures in the network. The distributed control of set membership and of separate and distributed control of transmission path creation, makes use of the multicast communication system much more reliable by virtue of its increased redundancy. Messages are exchanged between the set management functions and the Tree Leader functions to inform the Tree Leaders of changes in set membership and in the viability of various transmission paths. Change notification messages from the Set Manager to the Tree Leaders are invoked whenever a tree user joins or leaves a set, and whenever the Set Manager fails to receive a tree refreshing message from a Tree Leader. An automatic timeout feature allows the Tree Leader to respond to failures of transmission links, which cause partitions of the tree in a rapid and effective manner.

BRIEF DESCRIPTION OF DRAWINGS

The invention will be described with respect to a preferred embodiment thereof, which is further shown in the drawings in which:

FIGS. 7A–7D illustrate schematically, the flow of operations necessary to support all of tile Tree Leader functions operative at a node Set Manager in accordance with the preferred embodiment of the invention herein.

DETAILED DESCRIPTION OF PREFERRED EMBODIMENT OF INVENTION

Figure 1:
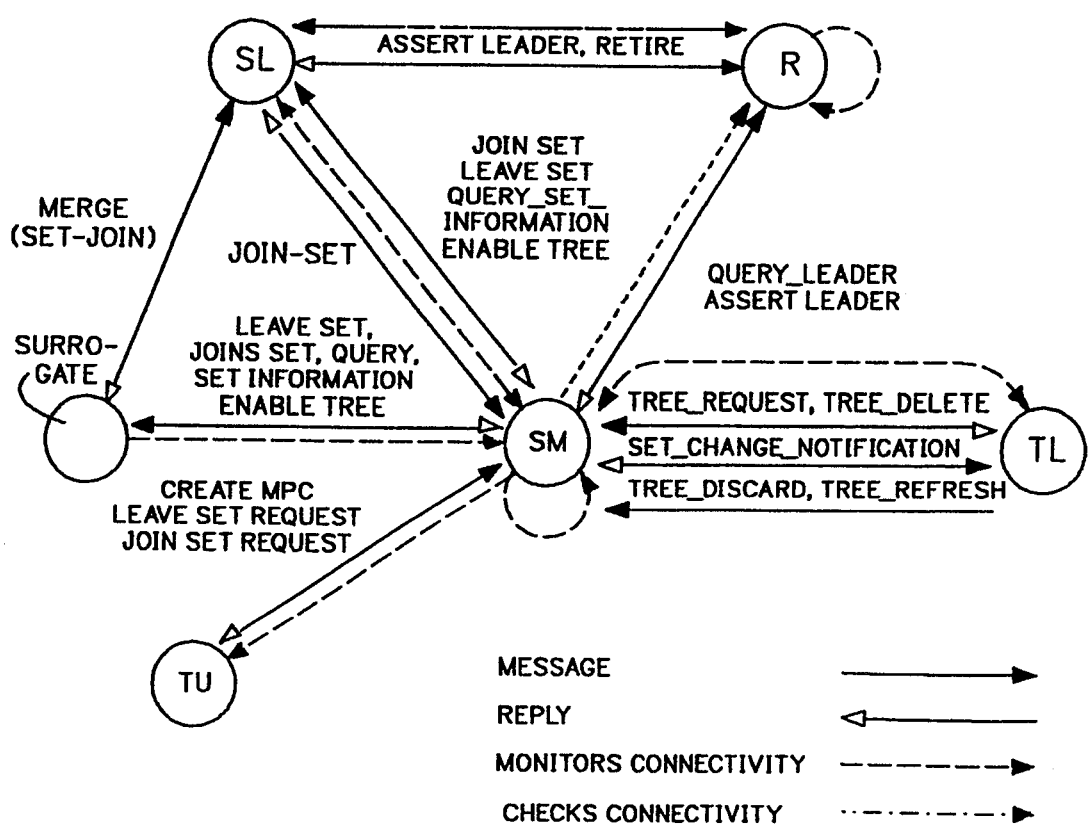
FIG. 1 schematically illustrates the interchange of messages between the various operative functions, assumable by a Set Manager at each node in a distributed network of nodes connected by communication links. Each node has facilities for performing the task Set Management, transmission user support, set leader management functions, network Registrar functions, and Surrogate Set Leader functions, all of which have been detailed in our copending application noted above. The preferred embodiment shown in FIG. 1 includes the new Tree Leader function and the message exchange protocol as shown in FIG. 1.

The present invention includes a protocol for allowing distribution trees in a network to span a set of members, in which the tree itself may be created and maintained separately from the creation and management of the set of users and of the network. A distribution tree is created by a Tree Leader having knowledge of the present set membership, and of the network topology given to it by a set manager. Some understanding of set management and of the terminology involved in our copending aforementioned application is necessary.

The Set Manager is the necessary component in a multicast service that maintains and coordinates the membership information for different multicast groups or sets. As shown in our aforementioned copending application, Set Management is implemented at all of the nodes in the network in our preferred embodiment, and has the necessary facilities for performing the specific functions of Set Manager, Set Leader and Network Registrar.

The control function code operating as a Set Manager acts on behalf of various Transport Users (TUs) located in or served by the particular node at which the Set Manager resides. The Set Manager (SM) keeps track of local membership and all group IDs for which local members are present and serviced at that node. Group IDs uniquely identify a group of users.

The Set Leader (SL) is a particular Set Manager for a given group ID that maintains the membership information regarding the entire set of users for a given set. This is distinct from the SM which knows only the information about its locally served members.

The Registrar (R) is a particular Set Manager, operating in the network to ensure that there is at most, one SL for each group ID connected within the network, and directs clients or requests from outside of a multicast set to the assigned SL to obtain information about the set.

In this context, the Tree Leader (TL) of the present invention is charged with the task of creating and maintaining a distribution tree for multicast use, based on set membership and network topology learned from the Set Manager. A Set Leader whose set requires a distribution tree, will become the Tree Leader. The Tree Leader will create a distribution tree reflecting the current set membership, and will manage extensions, deletions, or total destruction of the tree when it is no longer needed. A tree that has been created and maintained for a set allows a transport user to obtain access to the set without having to create its own distribution tree for the set membership. The set may be open or closed, in that outside non-members may utilize the services of the tree or not, accordingly.

Separation of the Set Manager, Registrar, and Set Leader functions, which are primarily concerned with the set membership and its administration, from the functions of the Tree Leader, which is concerned with the creation, maintenance, and control of a set of distinct paths within the network comprising that tree, is a key aspect of the present invention. Separating set management from tree creation and management leads to a modular and more efficient implementation, in particular, which is crucial for high speed networks. The establishment of an efficient distribution tree prior to commencement of communication is particularly necessary where high bandwidth packet traffic, such as that involved with video or multimedia communication, is an essential requirement. Even more importantly, a rapid response to a network failure in such realtime dependent systems requires some method of maintaining a tree and creating an alternate or recovery tree path quickly to avoid interruption of ongoing communications to the tree members.

The present invention also allows the creation of multiple trees to exist within a given set of users. This enables a multicast request exceeding the bandwidth capacity of an existing tree associated with this set, to be satisfied by the creation of an additional tree or trees or an entirely new tree to spread the bandwidth's demands equitably among the communication nodes and, thus, satisfy the needs of the set, a request which would be denied with other tree creation protocols.

A mechanism is included to guarantee that no communication loops of parallel paths servicing the same node or nodes exists. This is a significant problem in the prior art, and is addressed by the provision of a Tree Leader for the tree for which the Tree Leader is the only "owner" or leader which has access to the knowledge of the tree configuration and topology of the network, and has full control over the extension, deletion and configuration of the tree to avoid creating loops.

Finally, an improved tree set up mechanism or method is included, that allows the tree to be created via a series of parallel messages, unlike those of the prior art, which use serialized or hop-by-hop propagation of setup messages.

Figure 4:
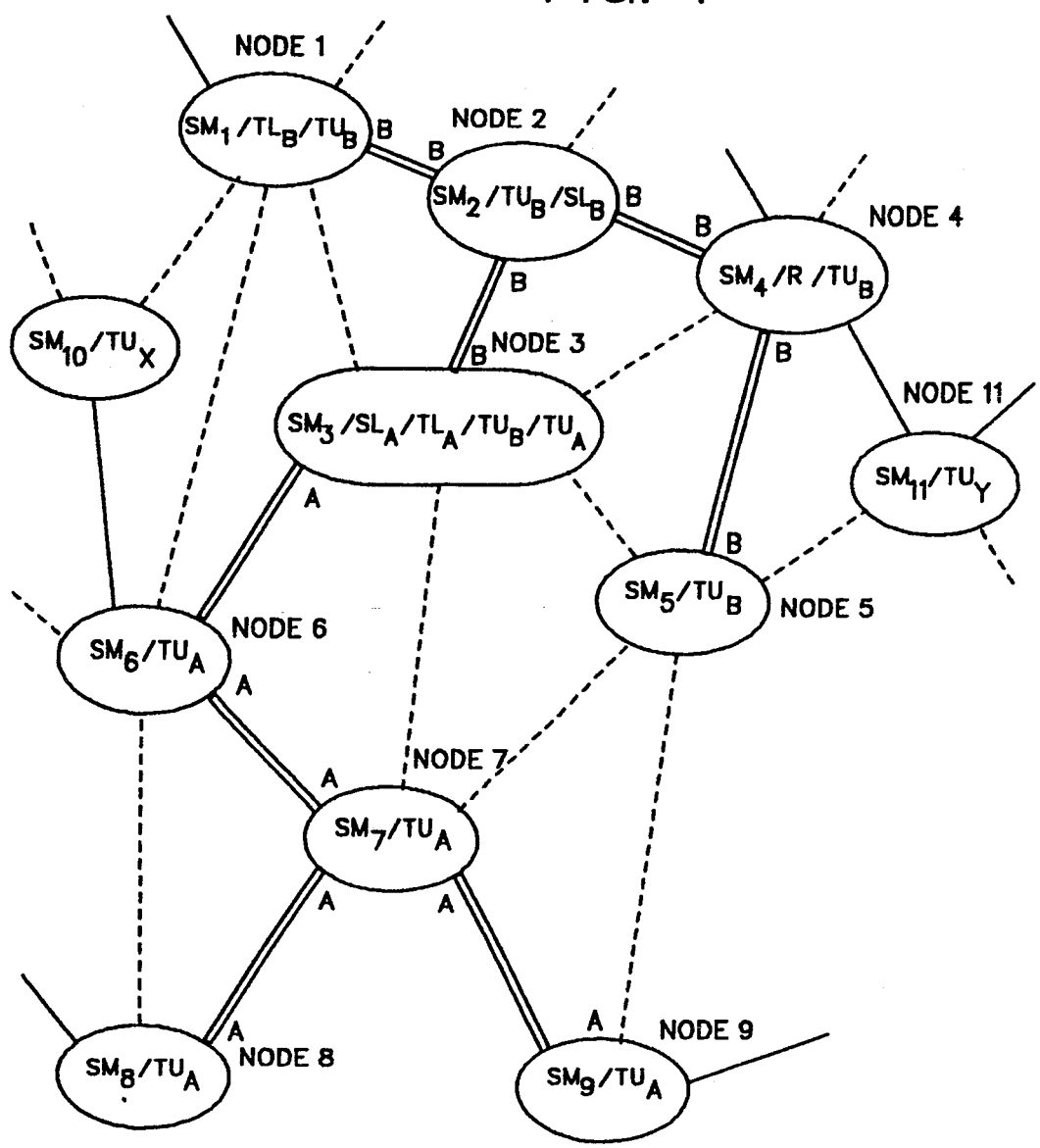
FIG. 4 illustrates in a schematic form, a segment of a large, multinode network, including all of the functionality of the present invention as well as that described in our copending application noted above.

What follows will be the description of the functions of a Tree Leader performing tree creation, maintenance and deletion tasks within a multinode distributed network of the form generally shown in FIG. 4 by having, at each node in the network, a Set Manager, as defined in our previously noted application, configured with the additional facilities to act as a Tree Leader, and responding to the various requests and demands presented by the Set Manager to the Tree Leader and vice versa, as shown schematically in FIG. 1.

As shown in FIG. 1, the Tree Leader (TL) function creates several different types of messages to be sent to the Set Manager. These include the Tree Request message, which creates or extends the distribution tree by marking links within the network with a known and unique tree address, the Tree Delete message which deletes members of the tree, the Tree Refresh message, which refreshes the marks for the links with the known tree address, and finally, the Tree Discard or destroy message which deletes the entire tree when it is no longer needed.

Each of these messages will be described in detail and the procedures for carrying out the functions invoked by each message will be given in full description. At the outset, however, some salient characteristics of the tree request message passing between the Set Manager and Tree Leader, such as shown in FIG. 1, both of which reside within a given node, will be described. The tree request message is sent along each path of the tree once it has been mapped out by a tree configuration algorithm, and is used to set up the tree by marking the various outgoing ports or connection points at each link and node within the tree. The message requests the Set Managers (SM) in each involved node to mark the transmission links, intranode links and, in some cases, terminal boundaries with a particular tree address that has been identified and negotiated as unique for that tree for all of the nodes which it encompasses at a given time. As will be described in greater detail later, the tree request message includes a variety of message fields, including the group identification which identifies the set that the tree is associated with, and is used by each Set Manager along a tree path to mark the termination edges or control points associated with the current set members. It also includes the node ID, which is the ID of the Tree Leader node. It includes the tree address, a 32-bit field, which is unique to a given tree over all the links and nodes which it encompasses; and a tree address correlator index number, which uniquely identifies the tree within the network itself, as will be described in greater detail. It also includes a return tree address interval, an indicator of a valid range of tree address that should be returned by a receiving Set Manager, and a set membership notification when a Tree Leader wants to receive notification that a given transmission user is joining or leaving a tree, and an indication of the smallest maximum realtime packet size required for traffic on the tree; the smallest maximum non-realtime packet size required, the minimum or smallest non-reserved packet size, and a clean-up bit, which indicates whether the receiving Set Manager should mark or unmark current links.

Finally, an indicator for the first copied subnode identifier is included. This is the node ID and the subnode of the first copied subnode along the path to be used when the clean-up bit indicator is set in the on condition.

Details of all of the foregoing will appear in the discussion which follows. Creating an initial distribution tree for a known set of users involves numerous steps that will be defined in greater detail. These steps generally encompass the following:

The Tree Leader must generate a tree address. This is a 32-bit random number generated in a random number generator. It must generate a tree address correlator index, which is an n-byte field, including the Tree Leader's node ID, the node's network ID, and a 4-byte counter value. The Tree Leader must compile a list of the set members subnodes; i.e., the nodes connected to each set member to be served. The Tree Leader must request a tree computation algorithm to compute the shortest or most effective paths, mapped to span all of the necessary subnodes once it has compiled a list of the subnodes to be served. Tree computation functions or algorithms per se are not a part of the present invention. Numerous tree computation algorithms exist and any of these may be employed as desired. An effective algorithm is one as defined in "Data Network", a text by Dimitri Bertsekas and Robert Gallagher, copyright 1987 by Prentiss-Hall, Inc. In this text, Chapter 5, page 312 shows examples of two useful algorithms for computing the path maps for a minimum weight spanning tree for distributing messages from an originating node to one or more users at plural nodes. Either algorithm is effective for the purposes of the present invention and may be suitably employed for the calculation of an initial distribution tree path map for a known set of users.

The Tree Leader must create or capture an internal image or representation of the tree as it is constituted, and will compile a list of any expected replies from nodes or subnodes to be traversed by the tree during the setup and operation. The Tree Leader must determine the maximum packet size for each type of traffic to be supported on the distribution tree for realtime, non-realtime, and non-reserved traffic. It may, if desired, include a means for counting the number of attempts at setting up or defining a tree, and a means for building the tree request message. The Tree Leader must also have a means for receiving replies from the various nodes and for interpreting them, and for communicating with the Set Manager and the Registrar in the network to share with them the status of the tree; i.e., whether it is enabled or dis-enabled, and the tree's addresses and accessed subnode.

As noted above, the first step is to generate a tree address which is, in the present embodiment, a 32-bit random number supplied by a random number generator of any arbitrary type. Numerous random number generators are available either in software or hardware, and are well known in the prior art, wherefore, they are not described in greater detail at this point.

The tree address correlator or index number is unique to the invention, and in the preferred embodiment includes the network ID or name of the node within the overall network; it is concatenated with the node ID itself and a 4-byte counter value. Overall, the tree address correlator index identifies the tree within the network. The counter value is incremented whenever a new tree address correlator index is needed. When a Tree Leader fails, it is not necessary for the Tree Leader to recall the last counter value, since a new one can be created as needed. Every tree being maintained by a given Tree Leader will be destroyed if the Tree Leader fails, because the Set Managers whose transmission users are on the tree will detect the failure, unmark the tree addresses of all trees originating in the failed Tree Leader's node, and inform their transmission users that the tree no longer exists.

With the correlator index, it is possible that the same tree address may be used for more than one tree within the network so long as the trees do not intersect at any common subnode.

A list of subnodes is compiled by the Tree Leader by communicating with the Set Manager, which gives the Tree Leader the set membership list containing all the subnodes that the Set Member's subnodes. It should be recalled that the set membership and management thereof is a function of the Set Manager, as defined in our aforementioned application, and is not involved with tree creation and management, which is the topic of the present application.

A tree computation algorithm, necessary to create or extend a distribution tree spanning every member's subnode to be served, is computed by tree computation algorithm provided with the following information:

The address of the originating subnode within the Tree Leader's node; i.e., the requesting subnode which is asking for the creation of a tree; the internal initial tree representation, initially the originating subnode's identification, that is returned by the tree computation function each time the Tree Leader calls for a new tree computation. It is used as an input the next time the tree computation is called whenever the tree is extended; a list of the target subnodes, this is a list of the subnodes to be added to the tree or configured within the original tree; a list of the links or subnodes to be avoided, if any, initially a null list. This list is built by the Tree Leader based upon previous negative or missing replies to a tree request message, as will be discussed later in greater detail. A bandwidth indicator is also necessary in the tree computation algorithm. If a given bandwidth is required, such as for video traffic, then only links that are capable of supporting such bandwidth can be chosen by the tree computation algorithm as candidate tree links. Some indication of the actual bandwidth requirement must also be given to such an algorithm.

An indicator for the directionality of the trees, such as uni-directional or bi-directional is required. An acceptable path length threshold from origin to destination may also be required. A realtime or non-realtime indicator must also be given, since the type of traffic that may be sent on the tree may vary and, if realtime support is required, only links capable of supporting realtime traffic can be chosen by the algorithm as candidate tree links. The smallest maximum packet sizes for each type of traffic must also be communicated to the algorithm. This is required since only those links which can support at least the smallest maximum packet size should be considered.

The tree computation function algorithm returns to the requesting Tree Leader, a set of identified paths among the involved nodes of the network that can be used for creating or extending the tree. It also includes a final tree representation or path map, a list of any subnodes that could not be reached by the final tree, and a confirmation of what the smallest maximum packet size for each traffic type will be. If the tree computation algorithm is unable to compute a successful tree, then the Tree Leader will do the following:

The internal representation of a distribution tree includes the set of automatic network routing (ANR) link identifiers in their sequence of use. The Tree Leader will maintain an internal representation of the map of the distribution tree, comprising all of the links in their order of connection from the point of origin to the various terminal interfaces or subnodes, where the tree ends. It will also include the assigned tree address and the unique tree address correlator for this particular tree.

Upon receiving a computed tree from the tree computation algorithm, the Tree Leader will send the required information in a multicast along the computed tree paths to all of the involved nodes and subnodes, and will await replies from each element. If positive replies are received, or if the Tree Leader is able to establish a limited distribution tree omitting some desired members, it will send, as detailed in our previous application noted above, an Assert message to the network Registrar to take over the function of an operative Tree Leader, with an enabled tree at a current tree address and accessed subnode.

A list of expected replies is generated based upon the list of links to be marked along each path generated according to the set of paths returned by the tree computation algorithm. The list is used to determine the expected number of replies and, if the tree is a bi-directional communication tree, two replies must be received by each link that is to be marked. The Tree Leader receives replies to the tree request message sent to the Set Manager for its nodes, and processes them as received. If all of the received replies are positive, the Tree Leader will start sending the tree refresh message to confirm the markings for the tree paths, and will send the Tree Leader assert message to its Set Manager.

In processing the replies which are received from the tree request (create) message, the Tree Leader may find that one or more replies are negative, and indicate that the tree address originally selected is invalid by reason of conflict with an already existing address at one or more nodes. The Tree Leader will perform a logical OR on all of the tree address intervals returned in the reply message, choosing an address within the interval not in use by any of the replying units. The tree creation procedure is repeated beginning with a new tree address, but using the same address correlator index. It will not be necessary to compute a new tree path, because of the replies were actually received, and it is only the tree address that is in question.

If one or more replies are not received, or negative replies indicate that a link, which is desired in the path, is not currently working, or if the limit of markable tree addresses is depleted, then the Tree Leader processes any pending join or leave requests, since these will affect the final set membership list, and the subnodes, therefore, that will be in the distribution tree. The Tree Leader then compiles a list of any invalid links for which no reply was received or which are unable to participate. The Tree Leader then performs a logical OR on the address intervals returned, and chooses an address within the interval not in use, repeats the tree create procedure using the new selected tree address and a new address correlator index. A new correlator index is required because links that were marked on the previous attempt will age out, and it is necessary to compute a tree by providing the computation algorithm with a list of the subnodes which would reflect current membership, and a list of the invalid links.

Figure 2:
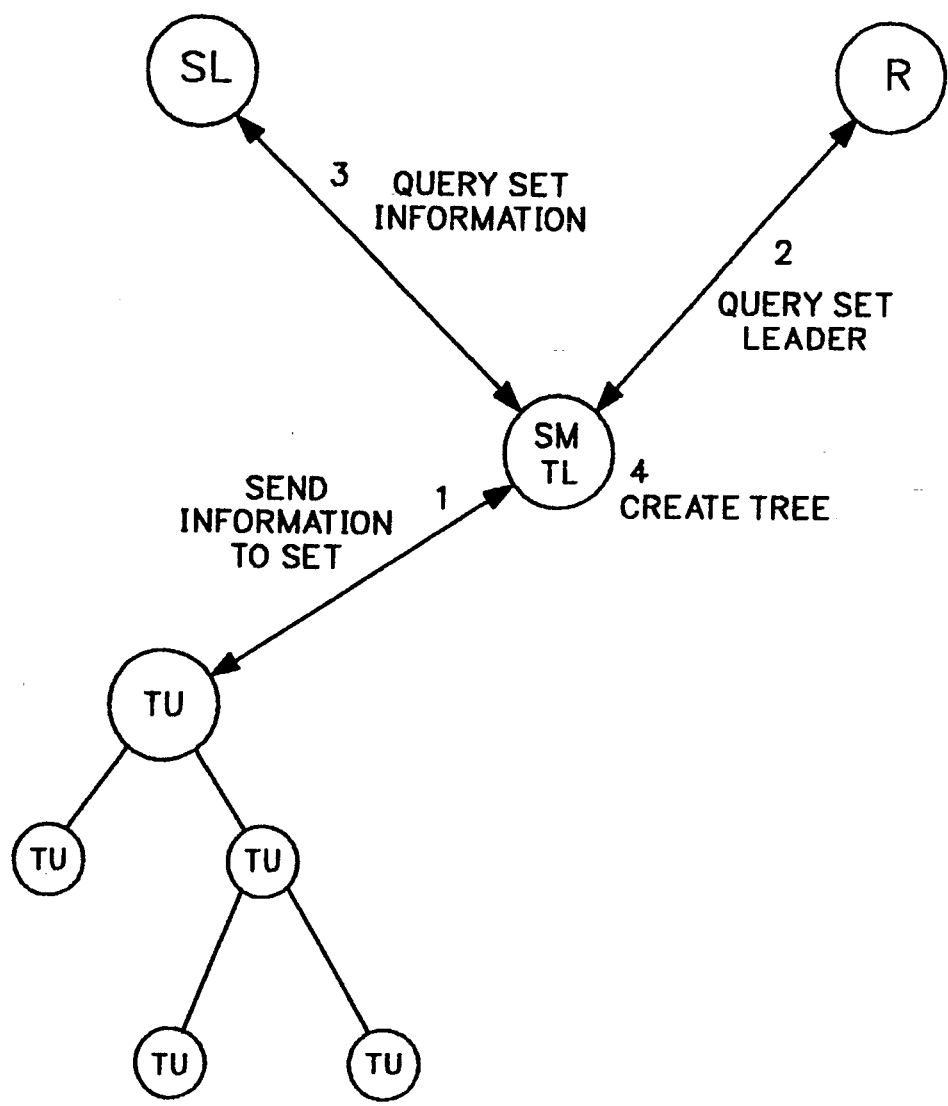
FIG. 2 schematically illustrates a Set Manager operating as a Tree Leader, and shows the flows of messages and controls necessary for the creation of a distribution tree for a given set of users.

The overall schematic of the flows of these messages and processes is shown in FIG. 2. A transmission user wishing to send information to a set of users, sends a first message to the Set Manager, which will act as Tree Leader. The Set Manager will query the network Registrar to determine who the current Set Leader for the identified set may be. It then queries the Set Leader to find the information regarding the members of the set and, in step four, begins the tree create process.

The steps of creating the tree in response to the TU's request is the first step, shown by the 1 adjacent to the information flow arrow in FIG. 2; querying the Set Leader is shown by the numeral 2 adjacent to the information flow between the Set Manager and the Registrar; querying of the Set leader for the set member information is shown by the numeral 3 adjacent that data flow, and the Set Manager/Tree Leader does the tree creation process 4, as identified by the numeral 4 adjacent to the Set Manager/Tree Leader.

Figure 3:
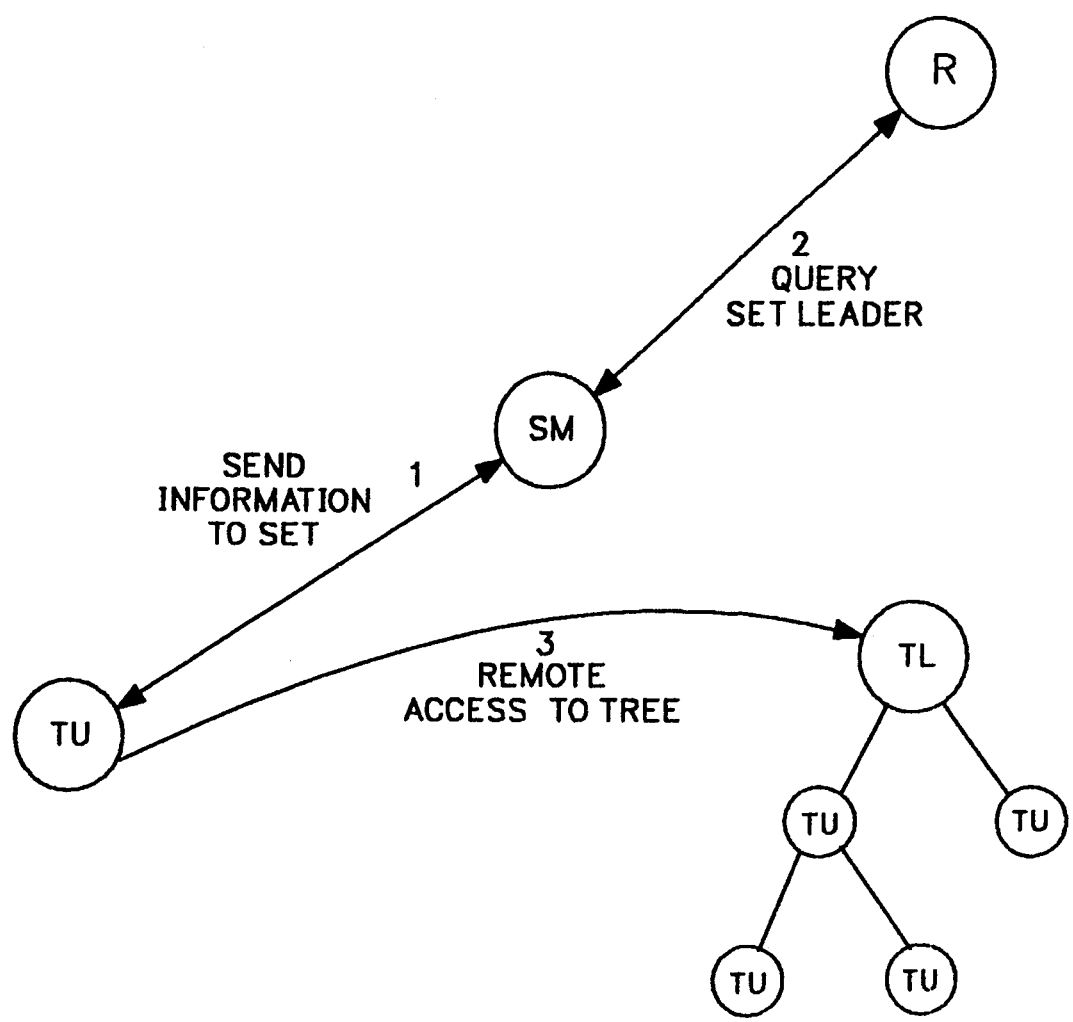
FIG. 3 schematically illustrates the role of a Set Manager operating as a Tree Leader to support a transmission user that desires to send a message via multicast to the members of the tree.

FIG. 3 shows the process of sending information to a set of users from a user outside of the set. The user first signals its Set Manager that it wishes to send information to an identified set. The Set Manager queries the Registrar to find out who this Set Leader for the identified set may be and returns that information to the requesting TU, which then forwards its information via a remote access through the Set Manager directly to the Tree Leader for the identified set, where it will be distributed accordingly.

The tree refresh message is sent by the Tree Leader to inform all Set Managers that the resident nodes at any tree addresses marked on their transmission links, intranode links, or terminal boundaries within their control remain in effect. No reply is necessary. The fields of information are the tree address and the tree address correlator index. Each time a Set Manager receives a tree refresh message, it reset its tree refresh timer to an initial value. If the timer should expire without receipt of a tree refresh message, the Set Manager will unmark all of the links and terminal boundaries marked with that tree address and send: 1) a set change notification message identifying the tree affected via the tree address correlator index; 2) the node ID and subnode ID that did not receive the refresh message; 3) an indicator showing the reason for the notification; and 4) the count of users.

The tree delete protocol is similar, and is one in which the Tree Leader deletes branches from the tree. The Tree Leader may also delete branches from the tree based on the loss of connectivity to members of the set. The tree delete message accomplishes this. The Tree Leader function sends the tree delete message, including the tree address and the tree address correlator index, and by sending the ANR from itself to the first subnode of the branch of the tree to be trimmed, having concatenated with it, the ANR for the branch to be trimmed off.

In order to prevent loops from being formed during creation of a tree or extension of a tree, the Tree Leader must recognize possible failures and act accordingly. Since the initial tree is mapped by the tree creation algorithm which avoids loops, initial tree creation looping is not a problem for the Tree Leader. However, if a Set Manager fails, if the Tree Leader receives a topology update indicating that a tree link has failed, or if a set change notification message is received indicating that a Set Manager did not receive the tree refresh messages, or if an attempted extension of the tree fails, transport users may have to be removed from the tree, or, in the last case, TU's may have to be prevented from being added to the tree; but in any case, the Tree Leader must re-extend the tree to add or prevent addition of the specific users to the tree. This is accomplished in the present invention with a clean-up marker bit.

If the Tree Leader detects the failures noted, it re-extends the tree to all nodes disconnected as a result of the failure. The extension process may go through disconnected subnodes marking different links, and potentially creating loops in the tree. In order to prevent this from occurring, the clean-up indicator bit is set "on" in the tree request message. If multiple paths having the same tree address are encountered at subnode previously on the tree, the Tree Leader clean-up bit set "on" causes that node receiving the message to unmark any previously existing link connections, and to mark only the newly requested ones.

FIG. 4 illustrates schematically a segment of a large, distributed network comprised of 11 nodes, numbered and named "Node 1" through "Node 11". Solid lines connecting the nodes indicate active communication links, and dashed lines indicate inactive links at the time assumed to exist when this depiction of the network was made. Each node contains a Set Manager identified as $SM_1$ through $SM_{11}$, in accordance with the invention described in our copending previously identified application. Each node also may encompass one or more transmission users who may be part of a set managed by a Set Leader.

In FIG. 4, two different sets are assumed. A set "A", identified by Set Leader A (SLA) residing in Node 3, and Set B represented by SLB residing in Node 2. Two trees are depicted in the rudimentary communication network shown on FIG. 4. Tree A arbitrarily comprises nodes 3, 5, 6, 7, 8, and 9. Tree A is managed by Tree Leader $TL_A$, residing in the same node, Node 3, as the Set Leader for Set A. The Tree Leader for Set B arbitrarily resides in Node 1, and Tree B comprises nodes 1, 2, 3, 4, and 5. The network Registrar arbitrarily resides in Node 4. Various transmission users, $TU_N$, reside at the various nodes as shown. Traffic from nodes outside of the trees or sets, might originate from Node 10 or Node 11, whose Set Managers (SM) would access the network Registrar to learn the address or location of the Set Leader for the identified set to which a node wishes to communicate, would learn from the Set Leader the identity of the Tree Leader, and would forward messages for distribution to the identified Tree Leader.

The link interfaces between the nodes, comprising the various trees, are marked with the alphabetic designation "A" or "B", depending upon which tree is involved. "A" or "B" are used for simplicity in FIG. 4, it being understood that the more thorough tree address designation, as described heretofore, would actually be employed. It may be seen that a node, for example Node 3 in FIG. 4, may take part in a plurality of different trees having different addresses without conflict. FIG. 4 is used as a general reference and may be referred to from time to time in the discussion which follows as an aid to understanding the processes.

Figure 5A:
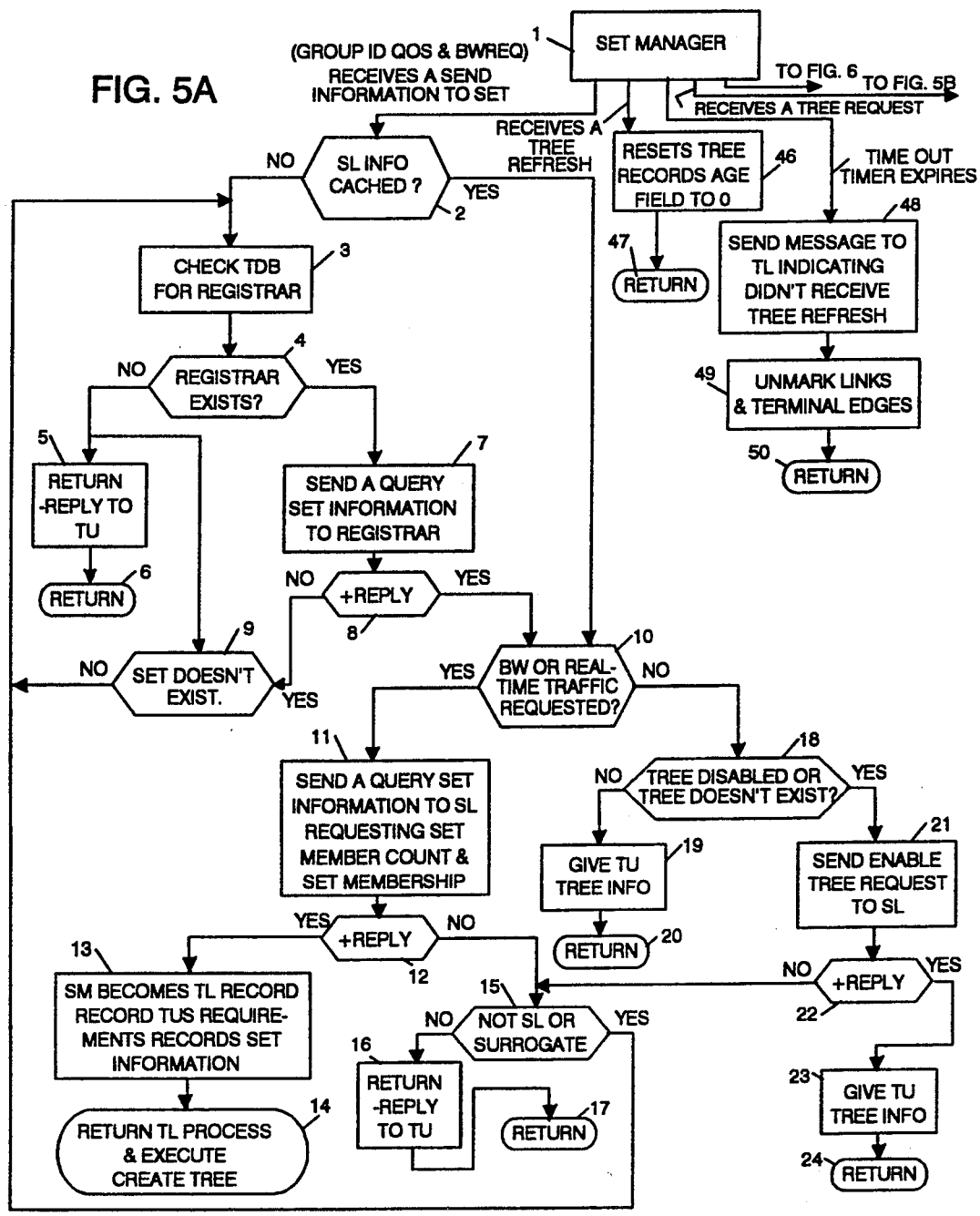
FIGS. 5A and 5B illustrate tile schematic flow of the processes necessary at a Set Manager to interface to a Tree Leader function in response to requests from transmission system users supported by the set manager.
Figure 5B:
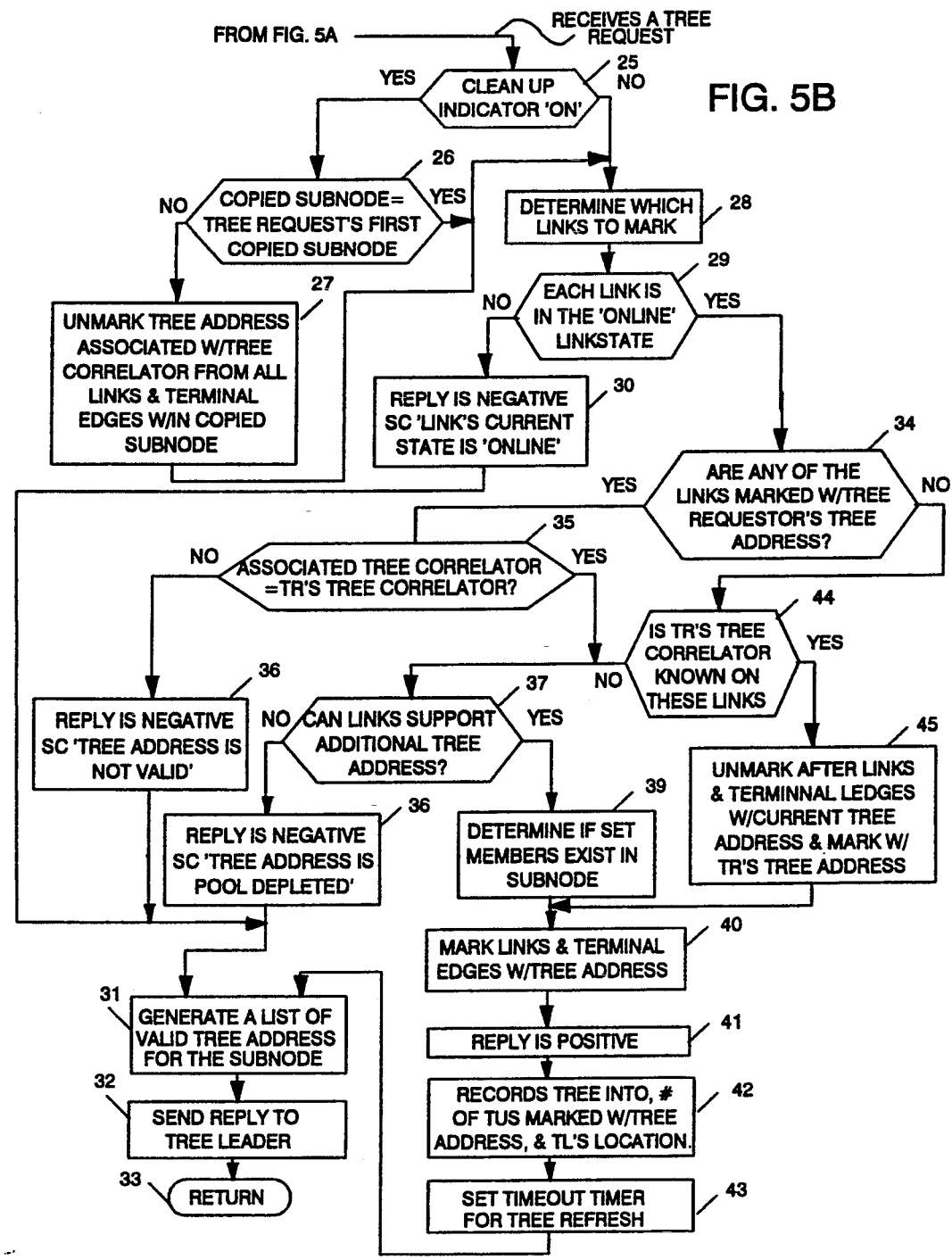
Figure 6:
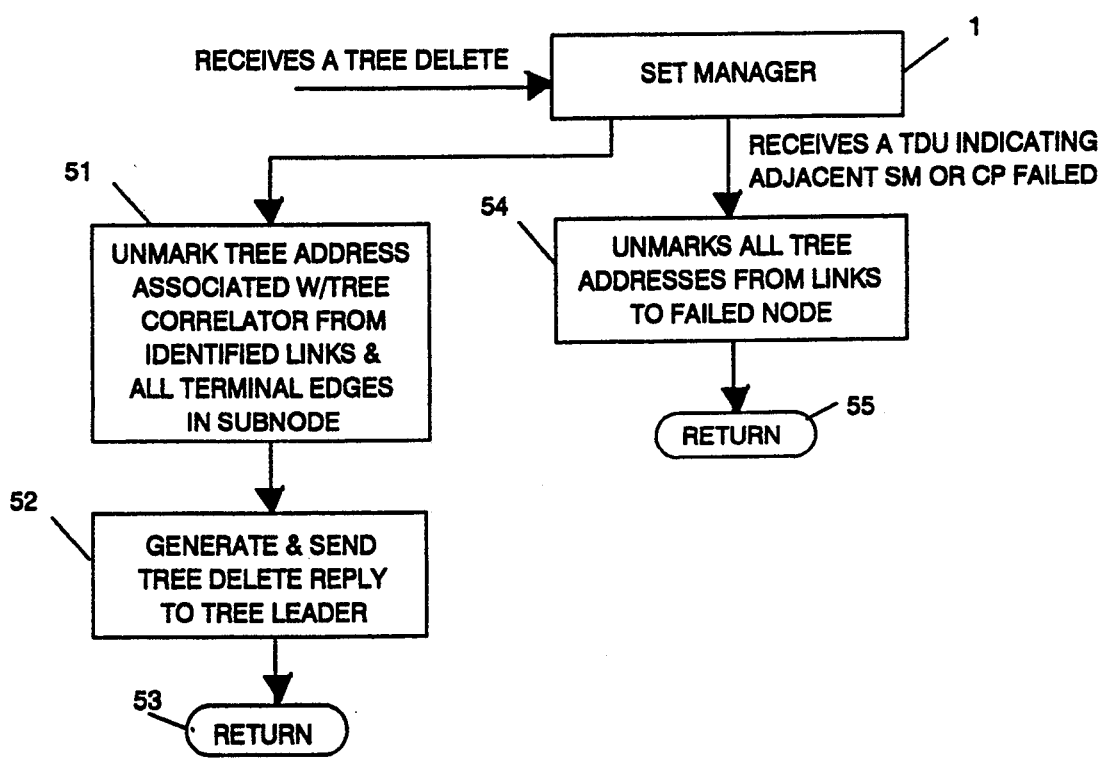
FIG. 6 illustrates additional functions of the Set Manager as it interfaces to a Tree Leader and to a set of transmission system users.

The detailed processes implemented in operative code by the Set Managers at each node are described in FIGS. 5 and 6 and the Set Leader functions within the Set Manager in FIG. 7, all of which will now be described in detail beginning with FIG. 5. The process begins with the Set Manager 1 in FIGS. 5 and 6, since it is the Set Manager that initially receives requests from any service transmission users at a given node to send information to an identified set, to receive a request to set up a tree, to refresh a tree, etc. The flows for the various scenarios will be described in detail as follows:

Assuming that the Set Manager 1 of FIG. 5 receives a request from a serviced TU to send information to an identified set having a given group ID, required quality of service and bandwidth requests, the Set Manager checks in box 2 for whether it has stored the Set Leader information for the identified group of users. If the answer is yes, it then checks whether bandwidth or response time requirements have been requested in box 10. If the answer is yes, it sends a query in box 11 for set information to the Set Leader requesting the set member count and set membership identifications.

The Set Manager awaits a reply, and if it receives a positive reply in block 12, the Set Manager becomes the Tree Leader in block 13, records the TU's requirements and records the user's set information, exiting to block 14 to return to the Tree Leader process and execute the beginning of creating a tree, as will be described later with reference to FIG. 7. If a positive reply was not received in block 12, the Set Manager checks to determine that it is not the Set Leader or a Surrogate Set Leader. If it is the Set Leader or Surrogate Set Leader, it exits and returns to block 3 to check the topology data base, as it would do in the event that no Set Leader information was found to be cached at the Set Manager.

If the check in block 15 indicates that the Set Manager is acting as the Set Leader or the Surrogate, block 16 is entered, and a negative reply is returned to the requesting TU, and the process returns in block 17 back to the start in Set Manager 1.

If the check in block 10 indicated that no bandwidth or response time requirements were requested; i.e., realtime traffic has not been requested, block 18 is entered to check whether the tree is disabled or is not in existence. If the tree is not disabled or is in existence, block 19 is entered and the TU is given the tree address information, and the process returns to Set Manager 1 via block 20.

If the tree is disabled or is not in existence, block 21 is entered from block 18. This invokes the sending of the enable tree request to the Set Leader for the identified set and a reply is awaited. If a positive reply is received, in block 22, the TU that requested the tree access is given the tree address information in block 23, and the process exits via block 24 to return to the Set Manager 1. However, if a negative reply is received, block 15 is entered from block 22 and the process flows as previously described from there.

If, however, upon receiving the initial request to send information to an identified set, the Set Manager's check for whether the Set Leader information has been cached finds that it is not present, block 3 is entered from block 2, where the topology database is checked for the location of the network Registrar. If the topology database indicates that no Registrar exists, block 4 is exited to block 5 where a negative reply is returned to the requesting TU, and the system returns via block 6 to the Set Manager 1. However, if a Registrar does exist, the normal case in an operative network, block 7 is entered and the Set Manager sends an inquiry for the set information to the Registrar, as shown by block 7. A reply is awaited in block 8. If a positive reply is received, block 10 is entered to check whether bandwidth or realtime response are requested, and the process flows as previously described from blocks 11 or 18, accordingly. However, if no positive reply is received, block 9 is entered to check whether with the requested set does in fact exist. If the set does not exist, block 5 is entered and a negative reply is sent to the TU, and the system returns to the Set Manager via block 6. However, if the SM is not the Registrar, the process reenters block 3 to check the topology database for the Registrar again. The result of all of this processing is that either the requesting TU has the information to send its message to an identified Set Leader and Tree Leader, or it has received a negative reply and is unable to transmit.

If Set Manager block 1 should receive a tree request, i.e., a request to set up a tree coming from another Tree Leader attempting to set up a tree, it checks in block 25 for whether the clean-up indicator bit is on. If the answer is yes, block 26 is entered and the receiving subnode SM's identified in the request is compared with the first copied subnode in the tree request. If they are not the same, the tree addresses associated with the correlator received in the request from all links and terminal boundaries within the copied subnode, are unmarked as shown in block 27, and the process continues to block 28. If the tree request's first copied subnode is in fact the same subnode receiving the request in block 26, then block 26 is exited directly for block 28 as indicated. Block 28 is entered if the clean-up indicator bit is found to be off or if the other conditions described previously prevail. Block 28 determines which links should be marked at the given node and then exits to block 29.

In block 29 each link is checked to determine if it is online, i.e., an active link. If the answer is yes, the question is asked as to whether any of the links are marked with a tree requestor's tree address. If the answer is yes, block 35 is entered and a check is made as to whether the tree correlator is equal to the tree requestor's tree correlator. If the answer is no, then the address is already in use on another tree, and a negative reply showing that the address is not valid is sent in block 36. However, if the address correlators match in block 35, block 37 is entered, and the question is asked as to whether the links at that node can support the additional tree address. If the answer is no, a negative reply is again sent indicating that the tree address pool has been depleted at this node, and block 31 is entered for a list of valid tree addresses generated for the subnode, the process flows to block 32 where the reply is sent to the Tree Leader, and ends in block 33 where the process returns to the Set Manager 1.

If, however, the links at the node can support additional tree addresses as checked in block 37, block 39 is entered to determine if the set members in the request exist at the subnode, and block 40 is then entered to mark the appropriate links or terminal boundaries with the identified tree address, which is done in block 40. If a positive reply is received by the Set Manager, block 41 exits to block 42, where the Set Manager records the tree information, the number of TUs that have been marked with the tree address at the responding node, and the Tree Leader's location identification, and block 43 is entered to set the timeout timer for the next tree refresh message. Whereupon block 31 is entered and a valid tree address list for the subnode is generated and sent in block 32 to the Tree Leader for its use.

Returning to block 34, if none of the links at the node are marked with the tree requestor's tree address, then block 44 is entered and a check is made to determine if the tree requestor's tree correlator is known on these links. If the answer is no, block 37 is entered and the process continues as described from there to determine if the links at the node can support the additional tree address. If the links can support the additional tree address, block 39 is entered and the process continues as described previously. If not, block 38 is entered and the process continues as previously described also.

However, if the tree requestor's correlator is known on the link served at the Set Manager's node, block 45 is entered where unmarking the links and terminal boundaries, having the current tree address and marking them accordingly with the tree requestor's tree address, is conducted in block 45, whereupon the process flows to block 41 and continues as described already.

If the Set Manager 1 receives a tree refresh request or message, block 46 is entered, where it resets the tree records age field to 0 and then returns via block 47, back to Set Manager block 1. If a timeout time expires, however, block 48 is entered and a message is generated to the Tree Leader indicating that the Set Manager node did not receive a tree refresh signal, whereupon block 49 is entered and links at the node are unmarked, and the process returns via block 50 back to the Set Manager 1. If the Set Manager 1 receives a tree delete message, block 51 is entered as shown in FIG. 6. The Set Manager will unmark the tree address associated with the tree correlator from the identified links and from all terminal boundaries at its subnode, and will then enter block 52 to generate and send the tree delete reply to the Tree Leader, and return via block 53 back to the Set Manager block 1.

If the Set Manager 1 receives a topology database update indicating that an adjoining Set Manager or control point has failed, block 54 will be entered and the Set Manager will unmark all of the tree addresses from the links to the failed node and return via block 55 to Set Manager 1.

All of the foregoing are the processes conducted within the Set Manager in response to requests from Transmission Users, Tree Leaders, or from the topology database, which is monitored for changes in the topology of the network. Various invocations of functions of the Tree Leader residing at the Set Manager's location also are indicated in FIGS. 5 and 6, as have been described. The actual flow of function of the Tree leader is invoked by a message from the Set Leader, the Set Manager, or the topology database update, and these are shown in FIG. 7.

Figure 7A:
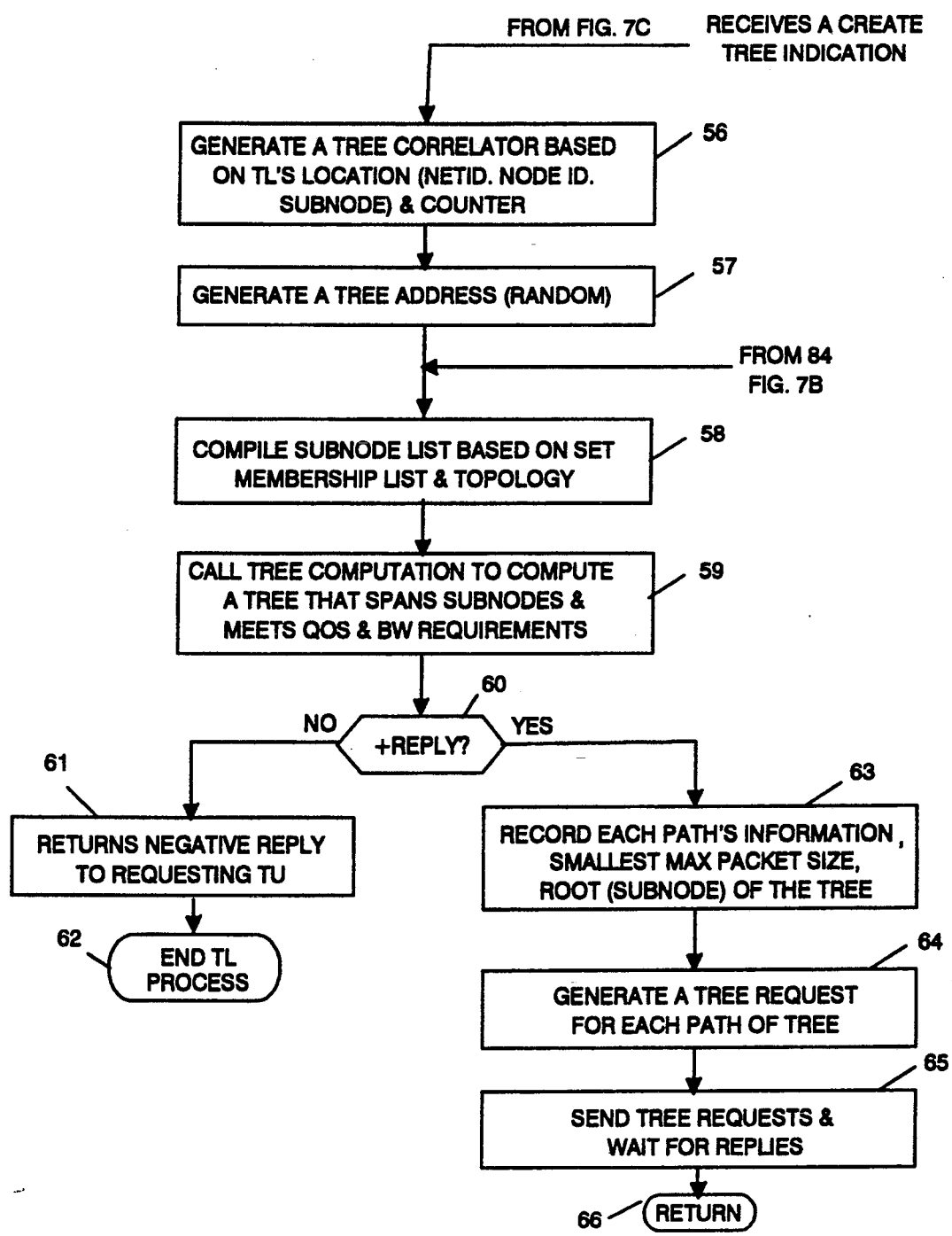
Figure 7C:
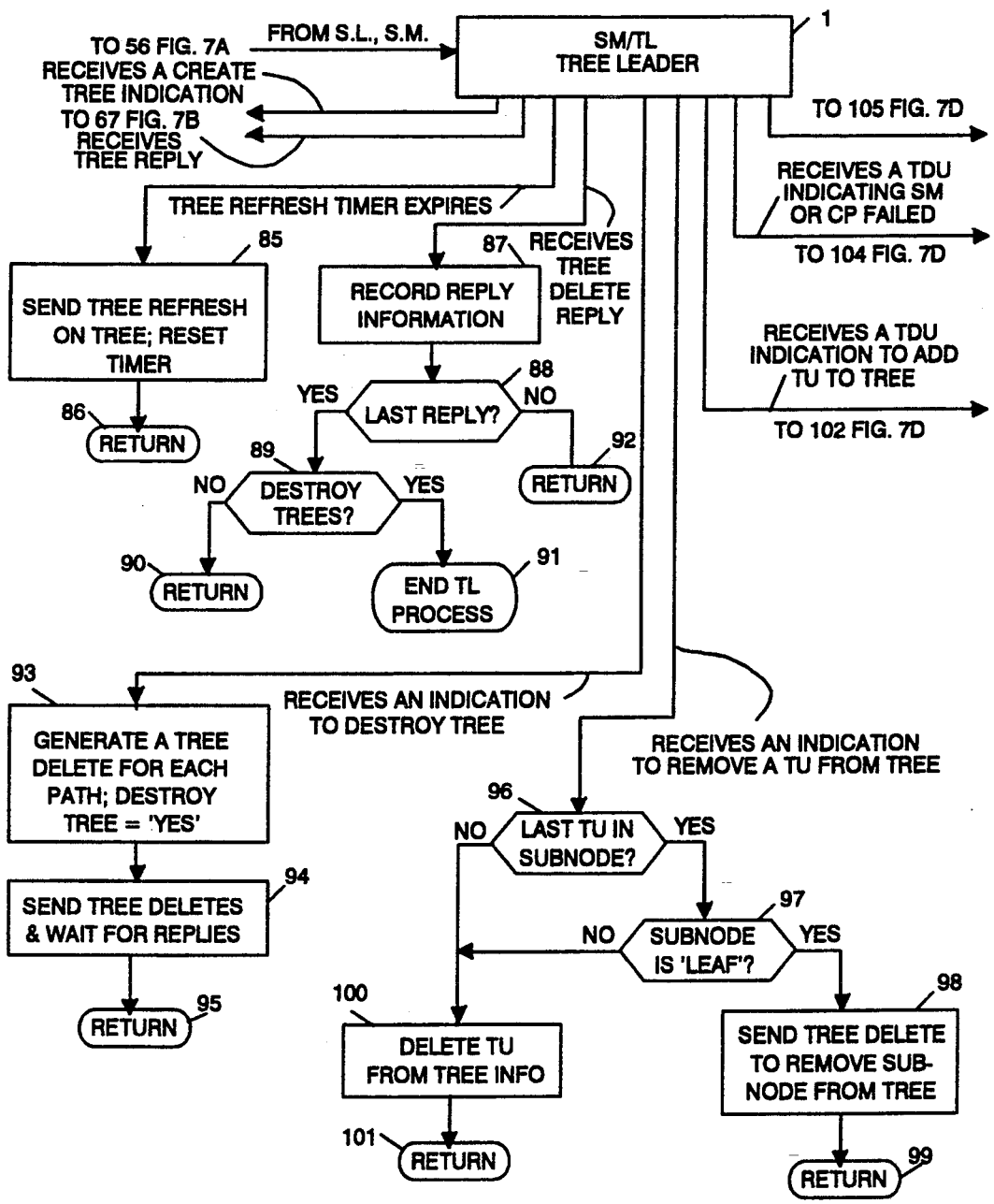

In FIG. 7, if the Tree Leader is functioning and receives an indication to create a tree, block 56 is entered first. In block 56, the Tree Leader generates a tree correlator index based on the Tree Leader's location in the network by concatenating the network ID, node ID, the subnode designation, and a 32-bit counter number. Then block 57 is entered where a tree address is generated by a random address generator. In block 58, the Tree Leader compiles a list of the subnodes based on the set membership list and the topology of the network, which it receives from the Set Manager servicing the request of the requesting TU. It then calls the tree computation algorithm in block 59 to compute a tree map that spans all of the subnodes and meets the quality and bandwidth requirement set by the requests to it, and awaits a reply in block 60. If a positive reply is received, block 63 is entered where the Tree Leader records each path information, including the smallest maximum packet size and the subnode or route address of the tree, whereupon it generates a tree request for each path of the tree, as shown in block 64. It then sends those tree requests and awaits replies in block 65, and returns via block 66 back to Tree Leader Set Manager function in block 1.

If no positive reply is received in block 60, the Tree Leader returns a negative reply to the requesting TU and ends its Tree Leader process in block 62. When the Tree Leader 1 receives a reply to its tree request messages, it records the reply information in block 67, and checks whether this is the last reply from the list of replies it is expecting. If it is not the last reply, the process returns via block 69 to await the receipt of the last reply. If the last reply has been received at block 68, block 70 is entered and it makes a recheck to determine that all replies have been received. If not all replies have been received, but the last reply nevertheless is indicated as having been received, block 83 is entered, where the Tree Leader sends a tree delete message erasing the old address for each path of the tree, but does not destroy the tree. It then selects a new tree address from the replies available as shown in block 84, and exits to block 58 where the process flows as already described.

If, however, block 70 indicates that all of the replies have been received, a check is made block 71 to determine if all positive replies have been received. If the answer is yes, block 76 is entered, where it is checked to determine if the expected TUs are all on the tree. If they are, block 80 is entered and a record is made of the TUs on the tree, and the tree information is returned to the requesting user, whereupon block 81 is entered and a tree refresh and start the refresh timer message is sent and the process ends by returning via block 82.

If, however, not all the replies are positive as checked in block 71, block 72 is entered to determine if only a sense code bit indicating an invalid address has been received. If the answer is yes, block 73 is entered where a new tree address is selected from among the available ones indicated, and block 74 is entered where the new tree address is used to replace the old, and a resending of the tree request with the new address is conducted, whereupon the process returns via block 75. However, if sense code errors, other than an invalid tree address is received, block 83 is entered and a tree delete for each path is sent, with a "do not destroy the tree" indication bit is set on, and the process continues as previously described for block 84, etc. If all replies have been received and all are positive, block 76 checks to see that the expected users are present on the tree. If they are not present, block 77 is entered where a check is made to determine whether the requesting user requires that all the TUs that were requested must be present on the tree. If the answer is no, the process flows to block 80, where the TUs actually present on the tree are recorded and the information is returned to the requesting Transmission User. However, if the requesting user requires the presence of all of its identified TUs, block 78 is entered and a negative reply is sent to the TU, indicating that a tree spanning all of its requested users could not be created, and the Tree Leader process ends in block 79.

If the Tree Leader 1 should detect that the tree refresh timer has expired, it sends a tree refresh signal on the tree and resets the time, as shown in block 85, and then returns via block 86.

When the Tree Leader receives a tree delete reply, i.e. a reply to a tree delete message, block 87 is entered and it records the reply information. A check is made in block 88 to determine if this is the last reply expected. If the answer is yes, a check is made as to whether the tree should now be destroyed in block 89. If the answer is yes, Tree Leader process is ended in block 91. But if the answer is no, the process returns via block 90 to the Tree Leader 1. If the last reply has not been received in block 88, the process returns also via block 92 to await further development.

If the Tree Leader should receive an indication that it is time to destroy the tree, block 93 is entered and a tree delete is generated for each path, with a destroy tree indicator marked yes. Whereupon block 94 is entered and the tree delete messages are sent and replies are awaited. The process returns via block 95.

When the Tree Leader receives an indication to remove a designated user from the tree, block 96 is entered, where it checks to determine if the indicated user is the last one present in the subnode served by the Tree Leader. If the answer is yes, then that subnode is a leaf, i.e., the outermost limit of the tree, as shown in block 97, the block 98 is entered and the tree delete message is sent to remove the subnode from the tree, and the process returns via block 99. However, if the subnode is not the leaf, block 100 is entered and the identified user is merely deleted from the tree information, whereupon block 101 is entered, and the process returns. The same result applies if the TU is not the last TU in the subnode, as check in block 96, whereupon its address is merely deleted from the tree information.

When the Tree Leader receives an indication or request to add a given user to the tree, block 102 is entered to determine if the transmission user subnode is presently on the tree. If the answer is yes, the process returns via block 103 since that transmission can already be reached through a subnode that is on the tree. If answer in block 102 is no, however, block 105 is entered, as will be described in greater detail a little later.

If the Tree Leader receives a topology database update message indicating that a Set Manager or control point has failed in the network, block 104 is entered to determine if the failed node is a leaf. If the answer is no, block 105 is entered for processing, as will be described shortly. If the answer is yes, however, block 115 is entered and a check is made as to whether the originally requesting user required all of the users to be present on the tree. If the answer is yes, block 116 is entered, and a negative reply is returned to tile requesting original user, whereupon block 117 is entered and the Tree Leader process ends. If the original requestor did not require all of the users to be present on the tree, block 118 is entered and the process merely returns to block 1.

When the Tree Leader 1 receives a topology database message indicating that a link on the tree has failed, or a message comes from a Set Manager that it did not receive a refresh signal, or if the other conditions described with reference to the test made in blocks 102 or 104 are negative, block 105 is entered.

In block 105, the Tree Leader is required to compile a subnode list needed to add anything to an existing tree. Block 106 is then entered, where the tree computation algorithm is called to extend the current tree to the new subnode. This would be the same process if a link failed and it is necessary to re-extend the tree. In block 107, a check is made as to whether positive replies have been received to the tree create message sent by invoking the process of tree creation in block 56. If a positive reply has been received, block 108 is entered and each path's information is recorded, whereupon a check is made in block 109 to determine whether multiple paths traverse a subnode that was previously on the tree. If the answer is no, block 119 is entered and a tree request for each path, with the clean-up bit set on, and the first copied subnode address set equal to the subnode of the extension which has been requested, is sent. In block 120, the tree request message is set and a reply is awaited, and the process continues by exiting via block 121 back to the return.

If, however, multiple paths traverse a subnode that has previously been on the tree, block 110 is entered and the clean-up bit is set on the tree request to mark the first branch of the new tree, and clean up any remaining links of the old tree by unmarking them. Whereupon block 111 is entered and any additional tree requests to put remaining links on the tree are executed. Whereupon block 112 is invoked where the tree requests with the clean-up bit set on are sent and a reply is awaited for any involved subnodes. Finally, the Tree Leader sends a remaining tree request for the clean-up bit set off in block 113, and exits via block 114 back to the return.

Having thus described the communication network and tree distribution method and apparatus, including processes for the creation, management, and deletion or destruction of distribution trees, it would be apparent to those of skill in the art that numerous departures from the specific order and steps of the process may be implemented without departing from the spirit and scope of the invention. Wherefore, what is described in the appended claims is by way of example only and not of limitation, wherefore:

what is claimed is:

1. A communications network having a plurality of nodes interconnected to one another by communications links, via which links messages are sent and delivered to communications network users located at said nodes, said network being organized for communications among members of defined subsets of said network users included in at least one Distribution tree, wherein each of said nodes comprises means for operating as a Distribution Tree Leader for each subset, said Distribution Tree Leader means including first means for generating a Distribution tree address; and second means receiving said Distribution tree address for generating a Distribution tree address correlation index and means for combining said index with said Distribution tree address to, uniquely identify said Distribution tree at all other said nodes having members of said subset included by said Distribution Tree Leader in said Distribution tree; and third means for generating and sending via said communications links, to all other said nodes having members served by said Distribution tree, a Distribution tree creation request message; and fourth means at all others of said nodes for receiving Distribution tree creation request messages and, responsive thereto, for generating and sending over said communications links a reply message indicating to said node sending said Distribution tree creation request message whether said Distribution tree address is currently in use at each said other node and said reply message also containing an indication of what Distribution tree, addresses are currently available for use at said node; and fifth means responsive to received replies from all other said nodes for enabling the distribution of messages to all other said nodes included in said Distribution tree using an address not in conflict with any of said received replies.

2. The network as claimed in claim 1, further comprising:

sixth means at each said node for associating said Distribution tree address not in conflict with said reply messages with the outbound said communications links included in said Distribution tree at each said node.

3. The network as claimed in claim 1, wherein:
  said first means further comprises a random number generator for generating said Distribution tree address.

4. The network as claimed in claim 2, wherein:
  said first means further comprises a random number generator for generating said Distribution tree address.

5. The network of any of claims 1 through 4, wherein:
  said address correlation index comprises the node identification of said node at which said Tree Leader resides and an arbitrary counter value.

6. The network as claimed in any of claims 1 through 4, wherein:
  said fifth means, upon receiving said reply message indicating that said Distribution tree address is currently in use at any said node, utilizes said indications received of currently available Distribution tree addresses, and chooses a new Distribution tree address from said available Distribution tree addresses.

7. A Distribution Tree Leader for use at at least one node in a plural node interconnected node network, comprising:

first means for generating a Distribution tree address; and second means receiving said Distribution tree address for generating a Distribution tree address correlation index and means for combining said index with said Distribution tree address to uniquely identify said Distribution tree at all of said nodes included by said Distribution Tree Leader in said Distribution tree; and third means at said at least one node for generating and sending via said interconnected node network to all others of said nodes having users served by said Distribution tree, a Distribution tree creation request message; and fourth means at all others of said nodes for receiving said Distribution tree creation request message and, responsive thereto, for generating and sending a reply message indicating whether said Distribution tree address is currently in use at each said other node and said reply also containing an indication of what Distribution tree addresses are currently available for use at each said node; and fifth means at said at least one node responsive to said reply messages from each of said other nodes for enabling the distribution of messages to all of said other nodes included in said Distribution tree using a said Distribution tree address not in conflict with any of said reply messages.

8. A Distribution Tree Leader as claimed in claim 7, further comprising:

sixth means at each said node for associating said Distribution tree address not in conflict with said reply messages with outbound communications links included in said Distribution tree at each said node.

9. A Distribution Tree Leader as claimed in claim 7, wherein:
  said first means further comprises a random number generator for generating said Distribution tree address.

10. A Distribution Tree Leader as claimed in claim 8, wherein:
  said first means further comprises a random number generator for generating said Distribution tree address.

11. A Distribution Tree Leader as claimed in any one of claims 7 through 10, wherein:
  said fifth means, upon receiving said reply message indicating that said Distribution tree address is currently in use at said node, utilizes said indications of said currently available Distribution tree addresses to choose a new Distribution address.

12. A method of managing a communications network having a plurality of nodes interconnected to one another by communication links via which messages are sent and delivered to users located at said nodes, wherein said network is organized for communication among members of a defined subset of said users into at least one Distribution tree, said method comprising steps of:

at a first node, selecting a Distribution Tree Leader for said subset;

at the first node, generating at said Tree Leader, a Distribution tree address;

at the first node, generating a Distribution tree address correlation index and combining said index with said Distribution tree address to uniquely identify said Distribution tree for said defined subset in said network;

at the first node, generating and sending over said network links to all said nodes having users served by said Distribution tree, a Distribution tree creation request message;

at all said nodes having users served by said Distribution tree, receiving said Distribution tree creation request message and generating and sending a reply message indicating whether said Distribution tree address is currently in use and an indication of what Distribution tree addresses are currently available for use at each receiving node; and at the first node, receiving said reply messages and choosing a Distribution tree address different from any Distribution tree address identified in a received reply message as being currently in use.

13. The method of claim 12, further comprising steps of:

assigning said unique Distribution tree address to each said communication link at each said node in said network which is a part of said Distribution tree for said defined subset of users.

14. A communications network having a plurality of nodes interconnected to one another by communications links, via which links messages are sent and delivered to communications network users located at said nodes, said network being organized for communications among members of defined subsets of said network users included in at least one Distribution tree, wherein each of said nodes comprises:

means for operating as a Distribution Tree Leader for each subset, said Distribution Tree Leader means including first means for generating a Distribution tree address; and second means receiving said Distribution tree address for generating a Distribution tree address correlation index and means for combining said index with said Distribution tree address to uniquely identify said Distribution tree at all other said nodes having members of said subset included by said Distribution Tree Leader in said Distribution tree; and third means for generating and sending via said communications links to all other said nodes having members served by said Distribution tree, a Distribution tree creation request message; and fourth means for receiving from all other said nodes reply message indicating whether said Distribution tree address is currently in use at a node sending a reply message, each said reply message also containing an indication of what Distribution tree addresses are currently available for use at the node sending the reply message; and fifth means responsive to received reply messages from all other said nodes for enabling the distribution of messages to all other said nodes included in said Distribution tree using a selected Distribution tree address not in conflict with a Distribution tree address identified in any reply message as being currently in use at another of said nodes.

15. The network as claimed in claim 14, further comprising:

sixth means for associating said selected Distribution tree address with the outbound said communications links included in said Distribution tree.

16. The network as claimed in claim 15, wherein:

said first means further comprises a random number generator for generating said Distribution tree address.

17. A Distribution Tree Leader for use in at least one note in a network having a plurality of interconnected nodes, comprising:

first means for identifying a set of nodes to be served by a Distribution tree;

second means for generating a Distribution tree address; and third means receiving said Distribution tree address for generating a Distribution tree address correlation index and combining said index with said Distribution tree address to uniquely identify said Distribution tree at each node in the identified set of nodes included in said Distribution tree; and fourth means for generating and sending via said network to all nodes in the identified set of nodes served by said Distribution tree a Distribution tree creation request message; and fifth means for receiving a reply message from each node in the identified set of nodes, each reply message indicating whether said Distribution tree address is currently in use at the replying node and also containing an indication of what Distribution tree addresses are currently available for use at the replying node; and sixth means responsive to said reply messages for enabling the distribution of messages to all of said nodes included in said Distribution tree using a selected Distribution tree address selected from a set of Distribution tree addresses other than those identified in reply messages as being in use at any of the replying nodes.

18. A Distribution Tree Leader as claimed in claim 17, further comprising:

seventh means for associating said selected Distribution tree address with outbound communications links included in said Distribution tree.

19. A method of managing a communications network having a plurality of nodes interconnected to one another by communication links via which messages are sent and delivered to users located at said nodes, wherein said network is organized for communication among members of a defined subset of said users into at least one Distribution tree, said method being performed at a given node and comprising steps of:

selecting a Distribution Tree Leader for said subset;

generating at said Tree Leader, a Distribution tree address;

generating a Distribution tree address correlation index and combining said index with said Distribution tree address to uniquely identify said Distribution tree for said defined subset in said network;

generating and sending over said network links to all said nodes having users served by said Distribution tree, a Distribution tree creation request message;

receiving reply messages from nodes to which the Distribution tree creation message was sent, each said reply message indicating whether said Distribution tree address is currently in use at the responding node and an indication of what Distribution tree addresses are currently available for use at the responding node; and choosing a Distribution tree address different from any Distribution tree address identified in a received reply message as being currently in use.

* * * * *